United States Patent
Miyazaki

(10) Patent No.: US 8,129,919 B2
(45) Date of Patent: Mar. 6, 2012

(54) DISCHARGE TUBE DRIVING DEVICE

(75) Inventor: Hiroyuki Miyazaki, Tokyo (JP)

(73) Assignee: Sumida Corporation, Tokyo (JP)

( * ) Notice: Subject to any disclaimer, the term of this patent is extended or adjusted under 35 U.S.C. 154(b) by 267 days.

(21) Appl. No.: 12/577,965

(22) Filed: Oct. 13, 2009

(65) Prior Publication Data

US 2010/0026196 A1 Feb. 4, 2010

Related U.S. Application Data

(63) Continuation of application No. PCT/JP2008/057100, filed on Apr. 10, 2008.

(30) Foreign Application Priority Data

Apr. 19, 2007 (JP) ................................ 2007-110793

(51) Int. Cl.
*H05B 41/16* (2006.01)
*H05B 41/24* (2006.01)
*H05B 37/02* (2006.01)
*H05B 39/04* (2006.01)
*H05B 41/36* (2006.01)
*H05B 37/00* (2006.01)
*H05B 39/00* (2006.01)
*H05B 41/00* (2006.01)

(52) U.S. Cl. ........ 315/254; 315/210; 315/246; 315/250; 315/312

(58) Field of Classification Search .................. None
See application file for complete search history.

(56) References Cited

U.S. PATENT DOCUMENTS

| 7,309,964 B2 * | 12/2007 | Wey et al. ..................... 315/312 |
| 2004/0056830 A1 | 3/2004 | Lee et al. |
| 2005/0017658 A1 | 1/2005 | Chien et al. |
| 2005/0099143 A1 | 5/2005 | Kohno |
| 2005/0140312 A1 | 6/2005 | Nishinosono et al. |
| 2005/0146286 A1 * | 7/2005 | Chan et al. ..................... 315/276 |
| 2006/0002106 A1 * | 1/2006 | Hong et al. .................... 362/224 |
| 2006/0061305 A1 | 3/2006 | Ahn et al. |
| 2006/0175981 A1 | 8/2006 | Hsueh et al. |
| 2008/0067944 A1 * | 3/2008 | Wang et al. ............... 315/185 R |

FOREIGN PATENT DOCUMENTS

| JP | 2004335422 A | 11/2004 |
| JP | 2005005059 A | 1/2005 |
| JP | 2005032940 A | 2/2005 |
| JP | 2005190835 A | 7/2005 |
| JP | 2005190991 A | 7/2005 |
| JP | 2007018997 A | 1/2007 |
| WO | 2008133024 A1 | 11/2008 |

* cited by examiner

*Primary Examiner* — Douglas W Owens
*Assistant Examiner* — Dedei K Hammond
(74) *Attorney, Agent, or Firm* — Coats & Bennett, P.L.L.C.

(57) ABSTRACT

A discharge tube driving device which drives a plurality of discharge tubes includes a switching circuit which generates a driving pulse, and a driving transformer which has a primary winding for receiving the driving pulse and a secondary winding for generating a high-frequency driving signal. The plurality of discharge tubes comprises a first discharge tube group and a second discharge tube group. One-side terminals of discharge tubes in the first discharge tube group are connected to the positive high-voltage terminal of the secondary winding of the driving transformer. One-side terminals of discharge tubes in the second discharge tube group are connected to the negative high-voltage terminal of the secondary winding of the driving transformer. Another-side terminals of the discharge tubes in the first discharge tube group are respectively connected to another-side terminals of the discharge tubes in the second discharge tube group.

5 Claims, 6 Drawing Sheets

DISCHARGE TUBE DRIVING DEVICE

This is a continuation of International Application PCT/JP2008/057100, having an international filing date of Apr. 10, 2008, now pending, and claims benefit of Japanese application 2007-110793, filed Apr. 19, 2007, both of which are incorporated herein by reference.

TECHNICAL FIELD

The present invention relates to a discharge tube driving device which causes a plurality of discharge tubes to emit light.

BACKGROUND ART

As is well known, a liquid crystal display panel incorporates, in its rear surface, a plurality of discharge tubes serving as a backlight. A recent liquid crystal display panel tends to have a larger screen size. For example, liquid crystal TVs for household use conventionally had a 20-inch screen at most. However, the current mainstream is liquid crystal TVs using 32- to 45-inch liquid crystal display panels. As the size of the liquid crystal display panel becomes larger, the number of discharge tubes per liquid crystal TV largely increases.

FIG. 5 shows a discharge tube driving device according to a prior art which drives a plurality of discharge tubes having pseudo U-tube structures. The discharge tube driving device shown in FIG. 5 basically includes a control circuit 10, a switching circuit 20, and driving transformers T10 to T40.

The switching circuit 20 parallelly applies driving pulses to the primary windings of the driving transformers T10, T20, T30 and T40. The secondary winding of each of the driving transformers T10, T20, T30 and T40 is connected in series to two discharge tubes so as to form a so-called pseudo U-tube structure. A high-frequency driving signal generated in the secondary winding of each driving transformer turns on a corresponding discharge tube.

Japanese Patent Laid-Open Nos. 2005-005059 and 2005-032940 describe discharge tube lighting devices according to prior arts.

In the discharge tube driving device shown in FIG. 5 as a prior art, however, the low-voltage interconnections that connect the discharge tubes are short in the pseudo U-tube structures. To drive eight discharge tubes FL10 to FL80 in FIG. 5, the four driving transformers T10 to T40 are necessary on the board layout. The reason for this is as follows. The positive high-voltage interconnections and the negative high-voltage interconnections on the board cross each other, as indicated by the dotted circles in the circuit diagram of FIG. 6. For this reason, especially in the discharge tube driving device which requires a high voltage to drive the discharge tubes, such a board design is impossible. Hence, as described above, when the size of the liquid crystal display panel becomes larger, the number of discharge tubes required increases. For example, eight or more discharge tubes that form pseudo U-tubes require four or more driving transformers.

In the conventional scheme of the discharge tube driving device shown in FIGS. 5 and 6, the number of driving transformers increases along with the increase in the number of discharge tubes to be used. This also increases the area occupied by the driving transformers, resulting in an expensive and bulky discharge tube driving device.

DISCLOSURE OF INVENTION

It is therefore an object of the present invention to provide a discharge tube driving device capable of causing a plurality of discharge tubes having pseudo U-tube structures to emit light using less driving transformers.

In order to achieve the above object, according to the present invention, there is provided a discharge tube driving device characterized by comprising: a control circuit configured to generate a switching pulse; a switching circuit configured to generate a driving pulse under a control of the switching pulse; a driving transformer which has a primary winding for receiving the driving pulse and a secondary winding for generating a high-frequency driving signal; a first discharge tube group including a plurality of discharge tubes; and a second discharge tube group including a plurality of discharge tubes, wherein one-side terminals of the plurality of discharge tubes in said first discharge tube group are connected to a positive high-voltage terminal of the secondary winding of said driving transformer, one-side terminals of the plurality of discharge tubes in said second discharge tube group are connected to a negative high-voltage terminal of the secondary winding of said driving transformer, and another-side terminals of the plurality of discharge tubes in said first discharge tube group are respectively connected to another-side terminals of the plurality of discharge tubes in said second discharge tube group.

According to the present invention, there is also provided a discharge tube driving device characterized by comprising: a control circuit configured to generate a switching pulse; a switching circuit configured to generates a driving pulse under a control of the switching pulse; a driving transformer which has a primary winding for receiving the driving pulse and a secondary winding for generating a high-frequency driving signal; a first discharge tube group including n discharge tubes which is arranged in a first region formed by dividing a surface of a liquid crystal display panel into the first and second regions; and a second discharge tube group including n discharge tubes which is arranged in the second region of the liquid crystal display panel, wherein one-side terminals of the n discharge tubes in said first discharge tube group are connected to a positive high-voltage terminal of the secondary winding of said driving transformer, one-side terminals of the n discharge tubes in said second discharge tube group are connected to a negative high-voltage terminal of the secondary winding of said driving transformer, and another-side terminals of the n discharge tubes in said first discharge tube group are respectively connected to another-side terminals of the n discharge tubes of said second discharge tube group with making a sequence of the n discharge tubes in the first region corresponding to a sequence of the n discharge tubes in the second region each other.

According to the present invention with the above-described arrangement, it is possible to provide a discharge tube driving device which drives more discharge tubes using less driving transformers.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail with reference to the accompanying drawings. Note that the constituent elements described in the embodiments are merely examples. The technical scope of the present invention is determined by the scope of claims and is not limited by the following individual embodiments.

<First Embodiment>

Figure 1:
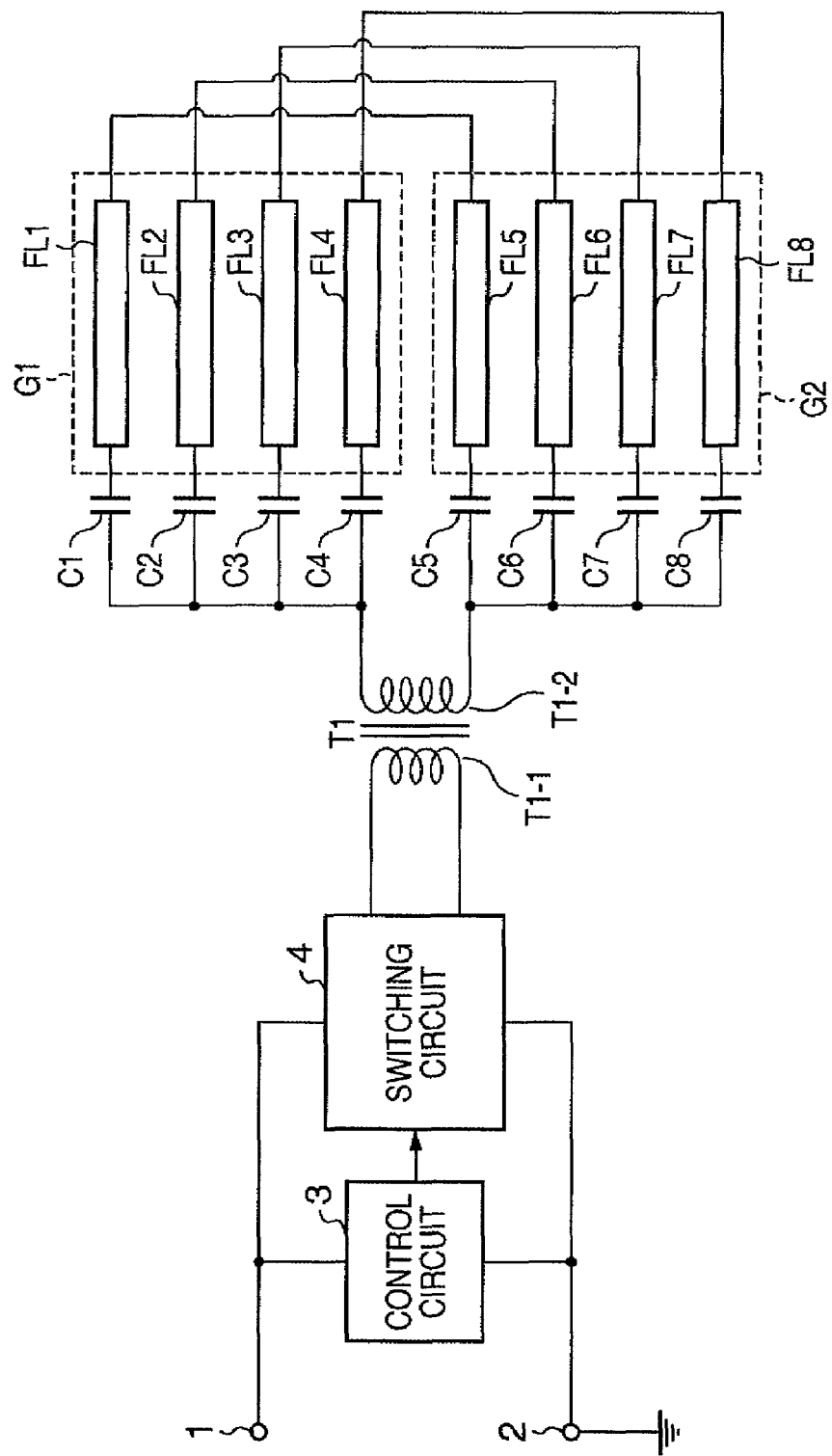
FIG. 1 is a circuit diagram of a discharge tube driving device according to the first embodiment of the present invention.

FIG. 1 illustrates a discharge tube driving device according to the first embodiment of the present invention. As shown in FIG. 1, the discharge tube driving device includes a control circuit 3, a switching circuit 4, a driving transformer T1, and first and second discharge tube groups G1 and G2 each including a plurality of discharge tubes.

More specifically, a DC voltage serving as a driving power supply is applied between input terminals 1 and 2. The applied DC voltage is applied to the control circuit 3 and the switching circuit 4 as a driving power supply. Note that one input terminal 2 is grounded.

The control circuit 3 incorporates an oscillation circuit, a PWM circuit, and the like, and applies a switching pulse to the switching circuit 4. The switching circuit 4 includes, for example, a plurality of FET transistors serving as switching elements. The switching circuit 4 drives the switching elements by the applied switching pulse, thereby generating a driving pulse.

The generated driving pulse is applied to a primary winding T1-1 of the driving transformer T1 so as to generate a high-frequency driving signal in a secondary winding T1-2 of the driving transformer. The frequency of the high-frequency driving signal is, for example, about 30 KHz to 65 KHz. The optimum value is determined based on the circuit scheme and the load condition.

Normally, a loop is formed to control the oscillation circuit and the PWM circuit in the control circuit 3 by detecting the current flowing to the discharge tubes connected to the load and generating a feedback signal to make the current constant, although not illustrated. Note that the control circuit 3 and the switching circuit 4 are formed using known circuits, and their arrangements are not particularly limited.

The discharge tube driving device shown in FIG. 1 includes the first and second discharge tube groups G1 and G2. The first discharge tube group G1 includes a plurality of, for example, four discharge tubes FL1 to FL4 in this example. The second discharge tube group G2 also includes a plurality of, for example, four discharge tubes FL5 to FL8 in this example.

Note that the number of discharge tubes provided in each of the first and second discharge tube groups G1 and G2 is determined in accordance with the driving capability of the driving transformer T1, and the plurality of discharge tubes need not always be four discharge tubes. However, the first and second discharge tube groups preferably include an equal number, for example, the same number of discharge tubes.

One terminal of each of the four discharge tubes FL1 to FL4 in the first discharge tube group G1 is connected to one terminal of the secondary winding T1-2 of the driving transformer T1 via a corresponding one of ballast capacitors C1 to C4. One terminal of each of the four discharge tubes FL5 to FL8 in the second discharge tube group G2 is connected to the other terminal of the secondary winding T1-2 of the driving transformer T1 via a corresponding one of ballast capacitors C5 to C8.

The other terminal of the discharge tube FL1 is connected to the other terminal of the discharge tube FL5. Similarly, the other terminal of the discharge tube FL2 is connected to the other terminal of the discharge tube FL6. The other terminal of the discharge tube FL3 is connected to the other terminal of the discharge tube FL7. The other terminal of the discharge tube FL4 is connected to the other terminal of the discharge tube FL8.

That is, the discharge tubes FL1 and FL5 which have a pseudo U-tube structure are connected in series, as shown in FIG. 1. The two terminals connected in series are connected to the secondary winding T1-2 of the driving transformer T1 via the ballast capacitors C1 and C5, respectively.

In addition, the discharge tubes FL2 and FL6 which have a pseudo U-tube structure are connected in series. The two terminals connected in series are connected to the secondary winding T1-2 of the driving Transformer T1 via the ballast capacitors C2 and C6, respectively.

The discharge tubes FL3 and FL7 which have a pseudo U-tube structure are connected in series. The two terminals connected in series are connected to the secondary winding T1-2 of the driving transformer T1 via the ballast capacitors C3 and C7, respectively.

The discharge tubes FL4 and FL8 which have a pseudo U-tube structure are connected in series. The two terminals connected in series are connected to the secondary winding T1-2 of the driving transformer T1 via the ballast capacitors C4 and C8, respectively.

The ballast capacitors generally use an electrostatic capacitive value of 5 pF to 22 pF (to about 100 pF in a special case). The optimum value is determined based on the circuit scheme and the load condition. Each discharge tube exhibits a negative resistance characteristic. For this reason, even when a plurality of discharge tubes are connected in parallel to one high-voltage secondary winding, a current flows to only one discharge tube having the lowest impedance. It is therefore impossible to turn on all discharge tubes. To cope with this, a ballast capacitor serving as a reactance element is inserted in each discharge tube to enable parallel connection.

The discharge tube driving device according to the first embodiment of the present invention described above makes it possible to drive the eight discharge tubes having pseudo U-tube structures using one driving transformer.

Figure 2:
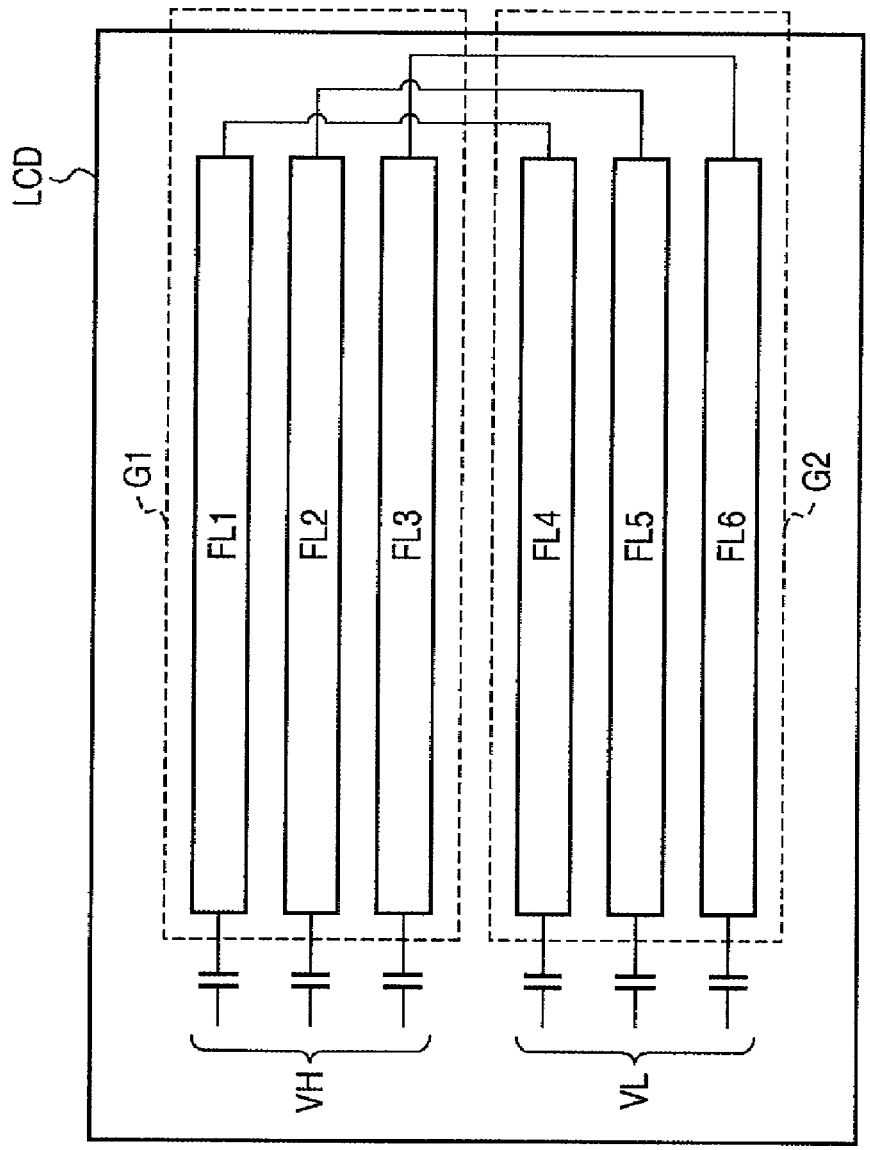
FIG. 2 is a view showing the layout relationship between a liquid crystal display panel and discharge tube groups according to the embodiment of the present invention.

In a liquid crystal display panel LCD having a plurality of discharge tubes arranged in parallel with respect to a horizontal plane, as shown in FIG. 2, the discharge tubes on the upper side and those on the lower side are divided into +VH and −VL. These discharge tubes are defined as the discharge tube groups G1 and G2. One discharge tube of the discharge tube group G1 and one discharge tube of the discharge tube group G2 form a pseudo U-tube structure. The low-voltage interconnections are longer than in the conventional pseudo U-tube structure. However, the positive high-voltage interconnections and the negative high-voltage interconnections do not cross on the board layout. To the contrary, the low-voltage interconnections that connect the discharge tubes cross each other. This solves the problem of insulating properties and makes it possible to drive a plurality of discharge tubes using one transformer.

The +VH, the positive high-voltage interconnections, and the positive high-voltage terminal described above indicate that they are set at a positive high voltage for a predetermined time, and the –VH, the negative high-voltage interconnections, and the negative high-voltage terminal indicate that they are set at a negative high voltage for a predetermined time. In the first embodiment, one output terminal and the other output terminal of the secondary winding of the transformer output different voltages. One terminal outputs a positive high voltage while the other terminal outputs a negative high voltage for a given time. The discharge tubes are ideally driven with a phase difference of 180° between the respective waveforms.

The layout of the discharge tubes in the above-described liquid crystal display panel LCD will be described in more detail. The panel surface of the liquid crystal display panel LCD is divided into two parts to form two regions. The discharge tube group G1 is arranged in the first region, whereas the discharge tube group G2 is arranged in the second region.

The panel surface can be divided using various methods. For example, the panel surface is divided in parallel to the long sides of the liquid crystal display panel LCD. In the example explained above with reference to FIG. 2, the panel surface is divided into two, upper and lower regions assuming that the liquid crystal display panel LCD is set upright while setting its long sides parallel to the installation plane.

For example, the discharge tube group G1 is arranged in the first region on the upper side, and the discharge tube group G2 is arranged in the second region on the lower side. Assume that each of the discharge tube groups G1 and G2 includes n discharge tubes. One terminal of the secondary winding of the driving transformer T1 is connected to one terminal of each of the n discharge tubes included in the discharge tube group G1. The other terminal of the secondary winding of the driving transformer T1 is connected to one terminal of each of the n discharge tubes included in the discharge tube group G2. The other terminal of each of the n discharge tubes included in the discharge tube group G1 is connected to the other terminal of a corresponding one of the n discharge tubes included in the discharge tube group G2 such that discharge tubes whose sequences in the first region and the second region correspond to each other are connected to each other.

In the example of FIG. 2, the three discharge tubes FL1, FL2, and FL3 are arranged in this order in the first region. In the second region, the discharge tube FL4 is arranged at a position corresponding to the position of the discharge tube FL1 in the first region. Similarly, the discharge tube FL5 is arranged at a position corresponding to the position of the discharge tube FL2 in the first region, and the discharge tube FL6 is arranged at a position corresponding to the position of the discharge tube FL3 in the first region. The other terminal of each discharge tube in the first region is connected to the other terminal of a discharge tube located at a corresponding position in the second region. More specifically, the other terminal of the discharge tube FL1 and that of the discharge tube FL4, the other terminal of the discharge tube FL2 and that of the discharge tube FL5, and the other terminal of the discharge tube FL3 and that of the discharge tube FL6 are connected to each other, as shown in FIG. 2.

Note that when the plurality of discharge tubes are arranged in parallel to the liquid crystal display panel LCD, the temperature is generally higher in the discharge tubes arranged at the central portion of the liquid crystal display panel LCD than in the discharge tubes arranged at the peripheral portion. This affects the light-emitting characteristic. Making, for example, the discharge tubes FL1 and FL4 or the discharge tubes FL3 and FL6, that is, a discharge tube arranged at the peripheral portion of the liquid crystal display panel LCD and a discharge tube arranged at the central portion form a pseudo U-tube structure suppresses the change in the light-emitting characteristic caused by the temperature difference between the discharge tubes at the peripheral portion and the central portion of the liquid crystal display panel LCD. This is more advantageous in terms of light-emitting characteristic than an arrangement that makes, for example, the discharge tubes FL1 and FL6 that are discharge tubes arranged at the peripheral portion, or the discharge tubes FL3 and FL4 that are discharge tubes arranged at the central portion form a pseudo U-tube structure.

Note that the panel surface of the liquid crystal display panel LCD need not always be divided in parallel to the long sides of the panel. For example, the panel surface may be divided perpendicularly to the long sides of the panel. In this case, each discharge tube is arranged in parallel to the short sides of the liquid crystal display panel LCD. The division position need not always be at the center of the panel and may be shifted from the center.

The number of divisions of the panel surface of the liquid crystal display panel LCD is not limited to two. The panel surface may be divided into four, six, . . . , or 2m (m≧1) regions. In this case, the discharge tubes can be arranged and connected by, for example, combining a plurality of sets of the above-described arrangement and connection in the panel surface divided into two regions.

<Second Embodiment>

Figure 3:
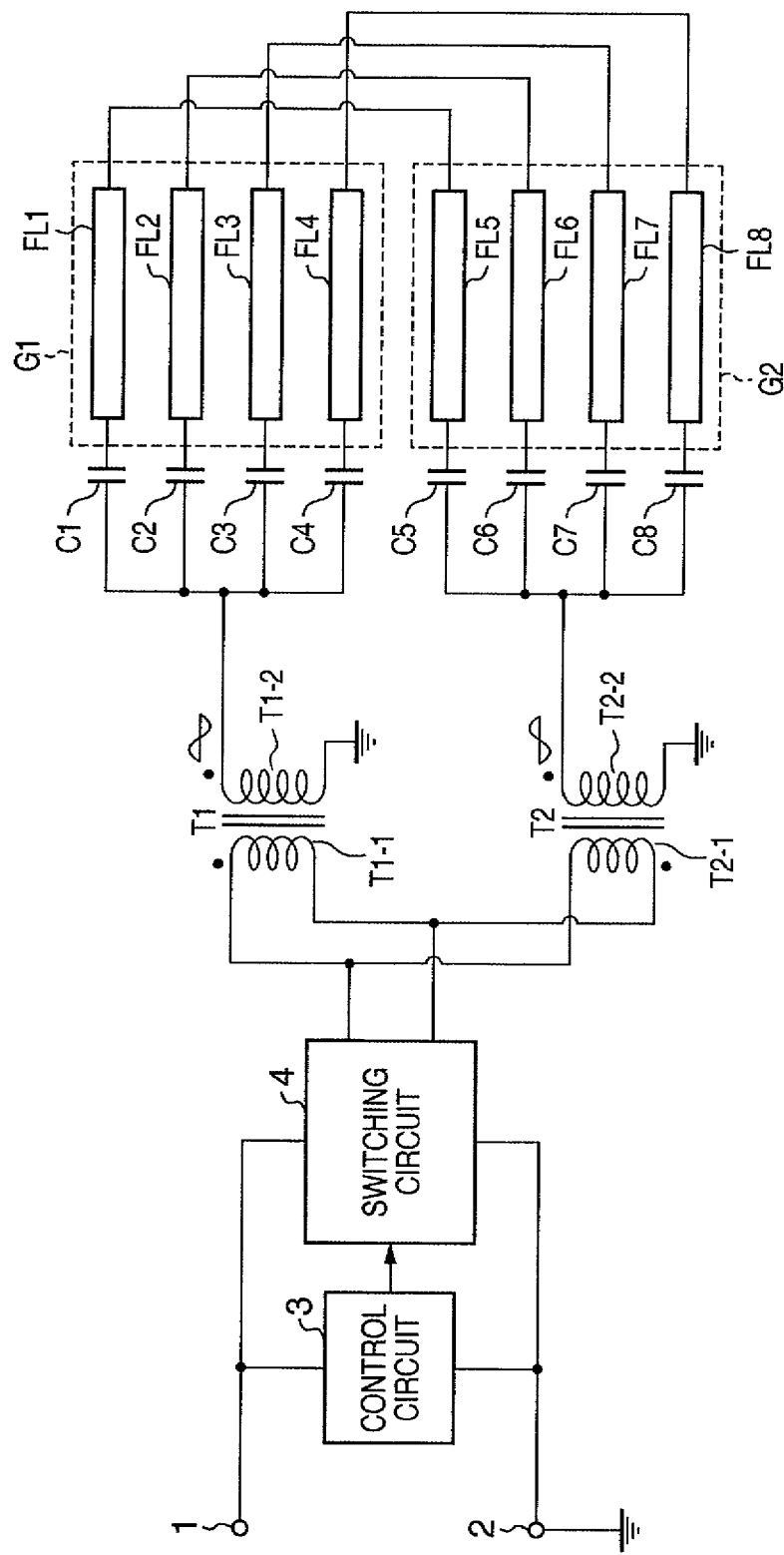
FIG. 3 is a circuit diagram of a discharge tube driving device according to the second embodiment of the present invention.

FIG. 3 shows an example of a discharge tube driving device according to the second embodiment of the present invention. The discharge tube driving device according to the second embodiment is a modification of the discharge tube driving device of the above-described first embodiment. Unlike the first embodiment, two driving transformers T1 and T2 are used. The discharge tube driving device according to the second embodiment includes the same components and arrangement as in the discharge tube driving device of first embodiment in a larger number. The same reference numeral denote the same parts, and a detailed description thereof will be omitted.

Driving pulses output from a switching circuit 4 are applied to primary windings T1-1 and T2-1 of the two driving transformers T1 and T2. This generates high-frequency driving signals in secondary windings T1-2 and T2-2 of the two driving transformers T1 and T2. The high-frequency driving signals generated in the secondary windings T1-2 and T2-2 are designed to have opposite phases (the phase difference is 180°).

For example, one and other outputs of the switching circuit 4 are connected to the primary windings of the driving transformers T1 and T2 while exchanging the winding start and end points of the driving transformers T1 and T2.

One terminal of each of four discharge tubes FL1 to FL4 in a first discharge tube group G1 is connected to one terminal of the secondary winding T1-2 of the driving transformer T1 via a corresponding one of ballast capacitors C1 to C4. In the second embodiment, the other terminal of the secondary winding T1-2 of the driving transformer T1 is grounded.

One terminal of each of four discharge tubes FL5 to FL8 in a second discharge tube group G2 is connected to one terminal of the secondary winding T2-2 of the driving transformer T2 via a corresponding one of ballast capacitors C5 to C8. In the second embodiment, the other terminal of the secondary winding T2-2 of the driving transformer T2 is grounded.

The other terminal of the discharge tube FL1 is connected to the other terminal of the discharge tube FL5. Similarly, the other terminal of the discharge tube FL2 is connected to the other terminal of the discharge tube FL6. The other terminal of the discharge tube FL3 is connected to the other terminal of the discharge tube FL7. The other terminal of the discharge tube FL4 is connected to the other terminal of the discharge tube FL8.

That is, the discharge tubes FL1 and FL5 which have a pseudo U-tube structure are connected in series. Each of the two terminals connected in series is connected to one terminal of a corresponding one of the secondary windings T1-2 and T2-2 of the driving transformers T1 and T2 via the ballast capacitors C1 and C5, respectively.

In addition, the discharge tubes FL2 and FL6 which have a pseudo U-tube structure are connected in series. Each of the two terminals connected in series is connected to one terminal of a corresponding one of the secondary windings T1-2 and T2-2 of the driving transformers T1 and T2 via the ballast capacitors C2 and C6, respectively.

The discharge tubes FL3 and FL7 which have a pseudo U-tube structure are connected in series. Each of the two terminals connected in series is connected to one terminal of a corresponding one of the secondary windings T1-2 and T2-2 of the driving transformer T1 via the ballast capacitors C3 and C7, respectively.

The discharge tubes FL4 and FL8 which have a pseudo U-tube structure are connected in series. Each of the two terminals connected in series is connected to one terminal of a corresponding one of the secondary windings T1-2 and T2-2 of the driving transformer T1 via the ballast capacitors C4 and C8, respectively.

The discharge tube driving device according to the second embodiment of the present invention described above also makes it possible to drive the eight discharge tubes having pseudo U-tube structures using two driving transformers.

Figure 4:
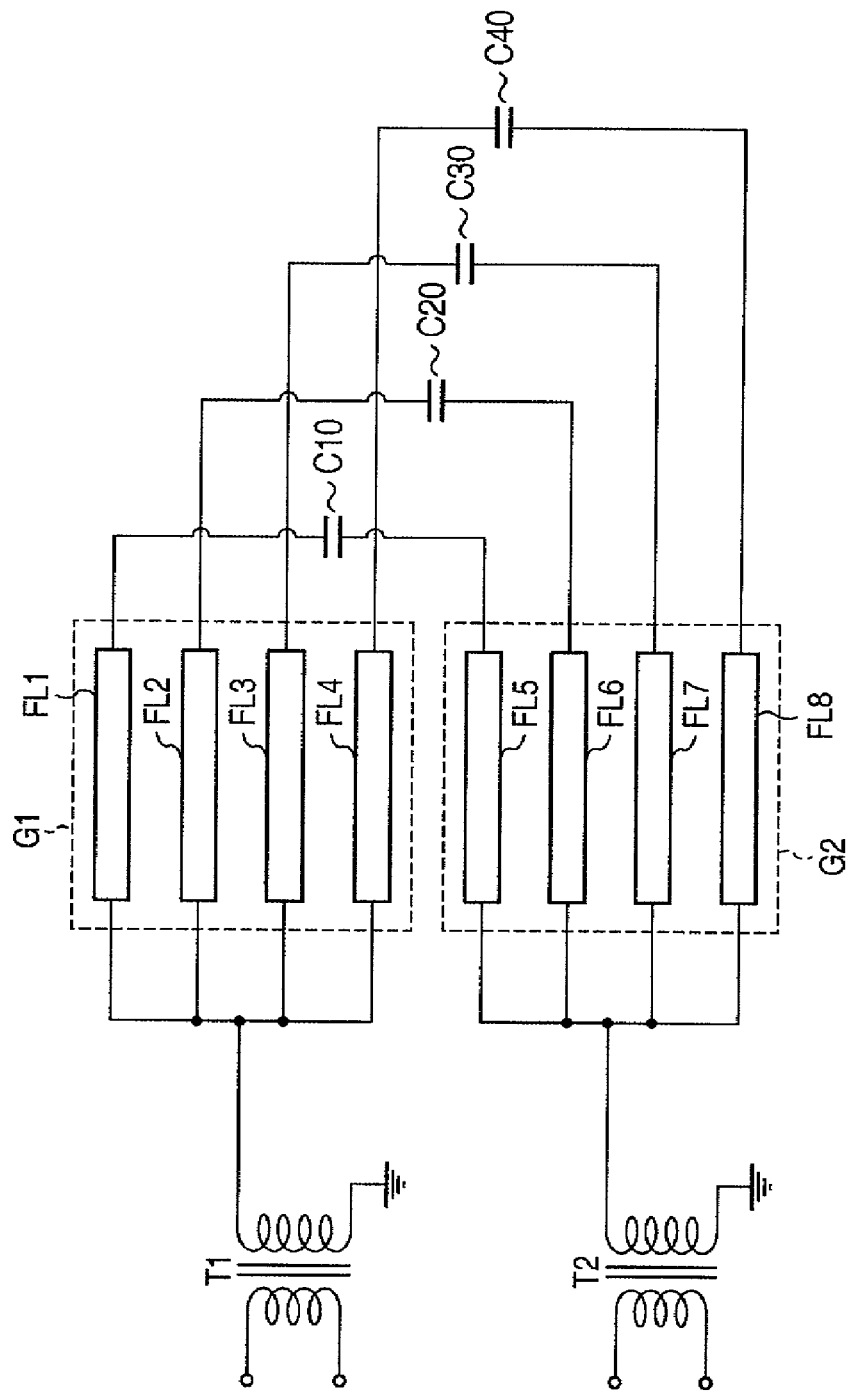
FIG. 4 is a circuit diagram showing a modification of the discharge tube driving device according to the second embodiment of the present invention.
Figure 5:
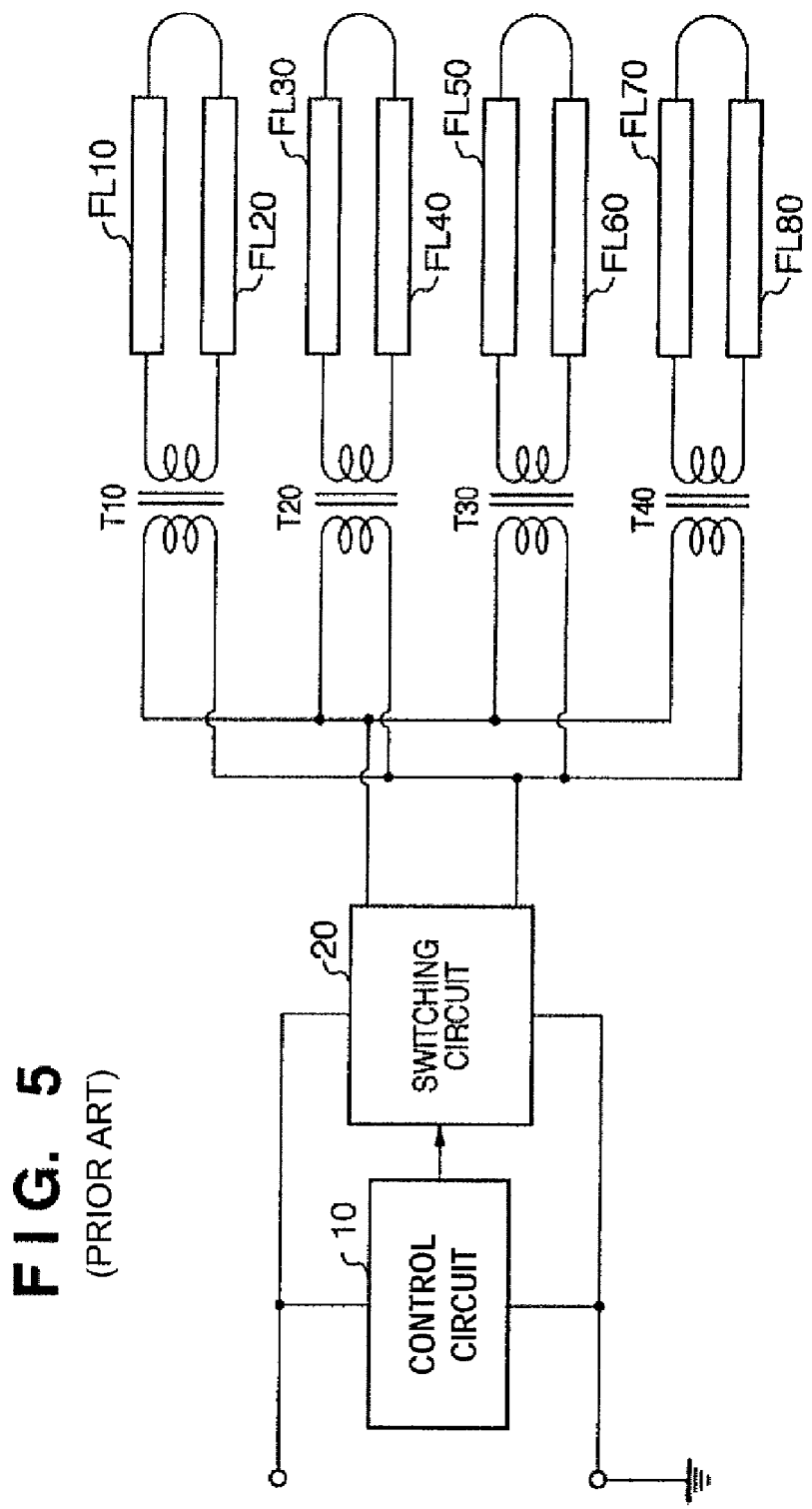
FIG. 5 is a circuit diagram of a discharge tube driving device according to a prior art.
Figure 6:
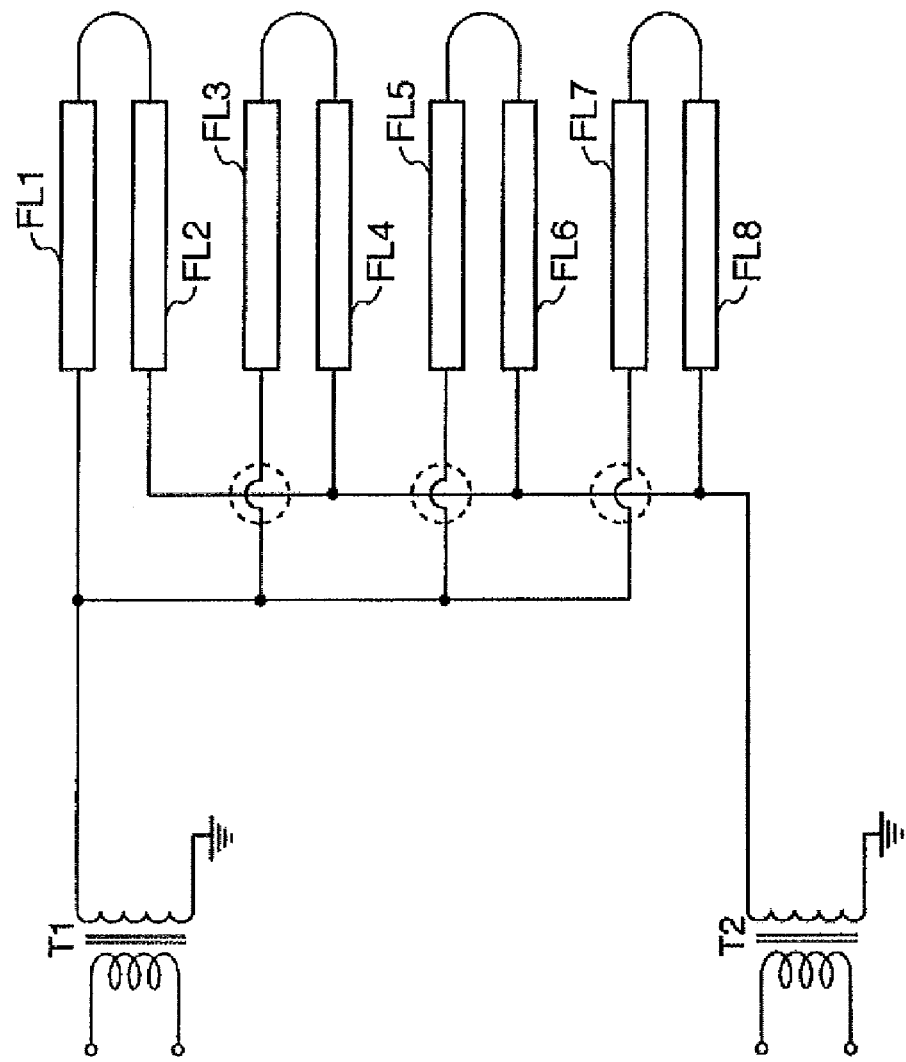
FIG. 6 is a circuit diagram of the discharge tube driving device according to the prior art.

As shown in FIG. 4, ballast capacitors C10, C20, C30, and C40 may be connected between the discharge tubes FL1 and FL5, between the discharge tubes FL2 and FL6, between the discharge tubes FL3 and FL7, and between the discharge tubes FL4 and FL8.

Note that the circuit arrangements described in the first and second embodiments of the present invention are merely examples. The present invention is not limited to those. Any other circuit arrangement is usable if it provides the same effects and operations. For example, each ballast capacitor described in the first and second embodiments may be replaced with an inductance element or any other element if it serves as a reactance element.

The present invention is not limited to the above-described embodiments, and various changes and modifications can be made within the spirit and scope of the present invention. Therefore, to apprise the public of the scope of the present invention, the following claims are made.

This application claims the benefit of Japanese Patent Application No. 2007-110793, filed Apr. 19, 2007, which is hereby incorporated by reference herein in its entirety.

The invention claimed is:

1. A discharge tube driving device comprising:
a control circuit configured to generate a switching pulse;
a switching circuit configured to generate a driving pulse under a control of the switching pulse;
at least one driving transformer which has a primary winding for receiving the driving pulse and a secondary winding for generating a high-frequency driving signal;
a first discharge tube group including a plurality of discharge tubes sequentially arranged in a first direction and disposed in parallel with respect to a plane;
a second discharge tube group including a plurality of discharge tubes also sequentially arranged in the first direction and disposed in parallel with respect to the plane, wherein a quantity of discharge tubes in the first and second groups is the same, and wherein the first and second groups are not intermingled;
wherein one-side terminals of the plurality of discharge tubes in the first discharge tube group are connected via respective reactance elements to a first high-voltage terminal to form first high-voltage interconnections, the first high-voltage terminal being one terminal of the secondary winding of the at least one driving transformer;
wherein one-side terminals of the plurality of discharge tubes in the second discharge tube group are connected via respective reactance elements to a second high-voltage terminal to form second high-voltage interconnections, the second-high voltage terminal being another terminal of the same or another secondary winding of the at least one driving transformer, such that the first high-voltage interconnections and second high-voltage interconnections do cross each other; and
wherein another-side terminals of the plurality of discharge tubes in the first discharge tube group are respectively connected to another-side terminals of the plurality of discharge tubes in the second discharge tube group such that each another-side terminal of a discharge tube in the first discharge tube group is connected only to a corresponding another-side terminal of a discharge tube in the second discharge tube group whose sequence in the second discharge tube group corresponds to the sequence of the connected first discharge tube in the first discharge tube group.

2. The discharge tube driving device according to claim 1, wherein the first high-voltage terminal is a terminal of a secondary winding of a first driving transformer, and the second high-voltage terminal is a terminal of a secondary winding of a second driving transformer driven by the switching pulse common to the first driving transformer, wherein the terminal of the secondary winding of the second driving transformer generates the high-frequency driving signal in phase opposite to the terminal of the secondary winding of the first driving transformer.

3. The discharge tube driving device according to claim 1 wherein the another-side terminals of the plurality of discharge tubes in the first discharge tube group are respectively connected to the another-side terminals of the plurality of discharge tubes in the second discharge tube group via respective reactance elements.

4. The discharge tube driving device according to claim 1 wherein the first and second discharge tube groups are respectively arranged in one and another regions which are formed by dividing a surface of a liquid crystal display panel in parallel to a long side of the panel.

5. The discharge tube driving device according to claim 1 wherein the first and second discharge tube groups are respectively arranged in one and another regions which are formed by dividing a surface of a liquid crystal display panel in perpendicular to a long side of the panel.

* * * * *